United States Patent
Li (12) United States Patent (10) Patent No.: US 6,429,605 B1
(45) Date of Patent: Aug. 6, 2002

(54) CONTROL SEQUENCE FOR ELECTRONIC BALLAST

(75) Inventor: Faye Li, Flushing, NY (US)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 09/703,572

(22) Filed: Nov. 1, 2000

(51) Int. Cl.[7] .................................................. G05F 1/00
(52) U.S. Cl. .................... 315/291; 315/209 R; 315/226; 315/243; 315/307; 315/DIG. 7
(58) Field of Search .............................. 315/209 R, 225, 315/219, 244, 247, 291, 307, DIG. 5, DIG. 7, 226, 243, 241 R (56) References Cited

U.S. PATENT DOCUMENTS

| | | | |
|---|---|---|---|
| 5,444,310 A | 8/1995 | Kataoka et al. | 307/125 |
| 5,612,597 A | 3/1997 | Wood | 315/293 |
| 5,789,871 A | 8/1998 | Shen et al. | 315/291 |
| 5,917,290 A | * 6/1999 | Shen et al. | 315/209 R |
| 5,936,357 A | 8/1999 | Crouse et al. | 315/247 |
| 5,969,484 A | 10/1999 | Santi et al. | 315/247 |
| 6,271,633 B1 | * 8/2001 | Shen et al. | 315/209 R |

* cited by examiner

Primary Examiner—Haissa Philogene (57) ABSTRACT

A novel circuit for driving a high intensity discharge (HID) lamp uses pulse width modulation (PWM) switches to generate a signal to be delivered to a HID lamp. During different portions of the operating cycle, the system uses one switch to facilitate all PWM signaling, while the circuit uses two switching switches to generate the PWM signaling during other portions of the cycle operation.

22 Claims, 8 Drawing Sheets

| $V_{AC}$ | $V_{LAMP}$ | $S_{HA}$ | $S_{LA}$ | $S_{HB}$ | $S_{LB}$ | $S_{HC}$ | $S_{LC}$ |
|---|---|---|---|---|---|---|---|
| 1201 POSITIVE | POSITIVE | OFF | PWM | OFF | ON | SYNCHRONIZED TO $S_{LA}$ | OFF |
| 1202 NEGATIVE | NEGATIVE | PWM | OFF | ON | OFF | OFF | SYNCHRONIZED TO $S_{HA}$ |
| 1203 POSITIVE | NEGATIVE | OFF | OFF | PWM | OFF | OFF | ON |
| 1204 NEGATIVE | POSITIVE | OFF | OFF | OFF | PWM | ON | OFF |

*NOTE: PWM IMPLIES THAT THE SWITCH IS OPERATING AT A RELATIVELY HIGH SWITCHING FREQUENCY (E.G. 100kHz). ITS ON TIME IS DETERMINED BY A FEEDBACK LOOP.

FIG. 12

CONTROL SEQUENCE FOR ELECTRONIC BALLAST

TECHNICAL FIELD

This invention relates to a ballast, and more particularly, to an improved method and apparatus for controlling a ballast to drive a lamp. The invention has particular application in the control of high intensity discharge (HID) lamps.

BACKGROUND OF THE INVENTION

High intensity discharge lamps typically operate in an alternating current (AC) mode when in steady state. More specifically, these lighting devices are typically driven with a square wave that alternates between a plus and minus voltage, so that in a steady state, current is not flowing in one direction for more than a few milliseconds. An exemplary frequency at which such a device might operate would be 60 Hz. Due to the physics and design of such devices, if current flow is in one direction for too long, damage to the device will occur.

Figure 1:
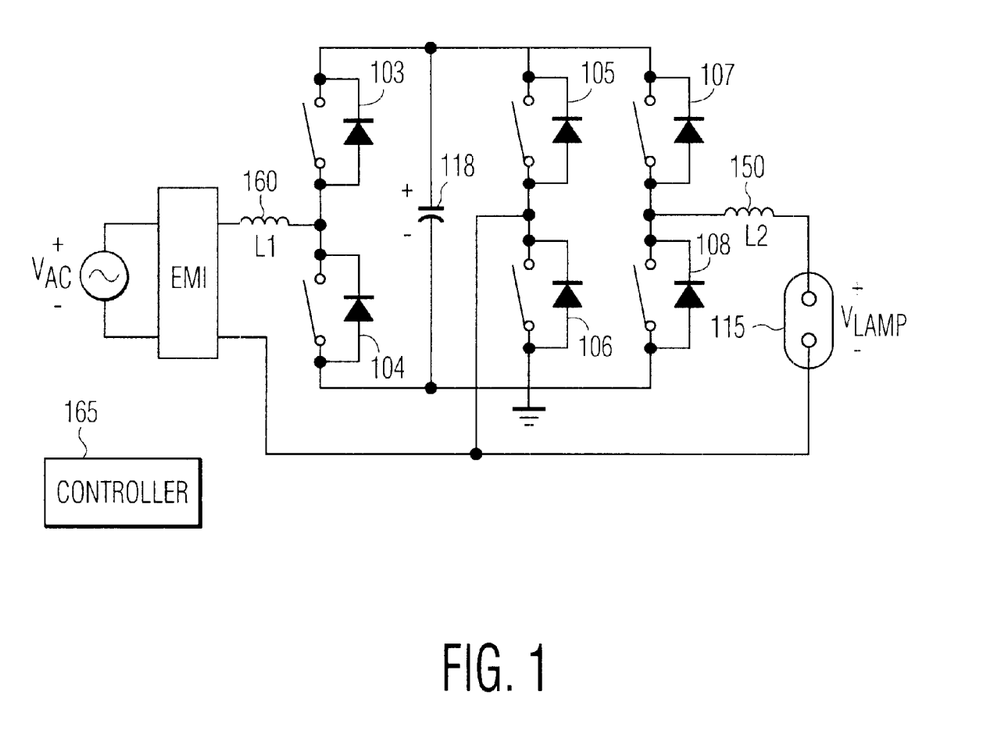
FIG. 1 shows an exemplary embodiment in the circuit for use in implementing the present invention.
Figure 2:
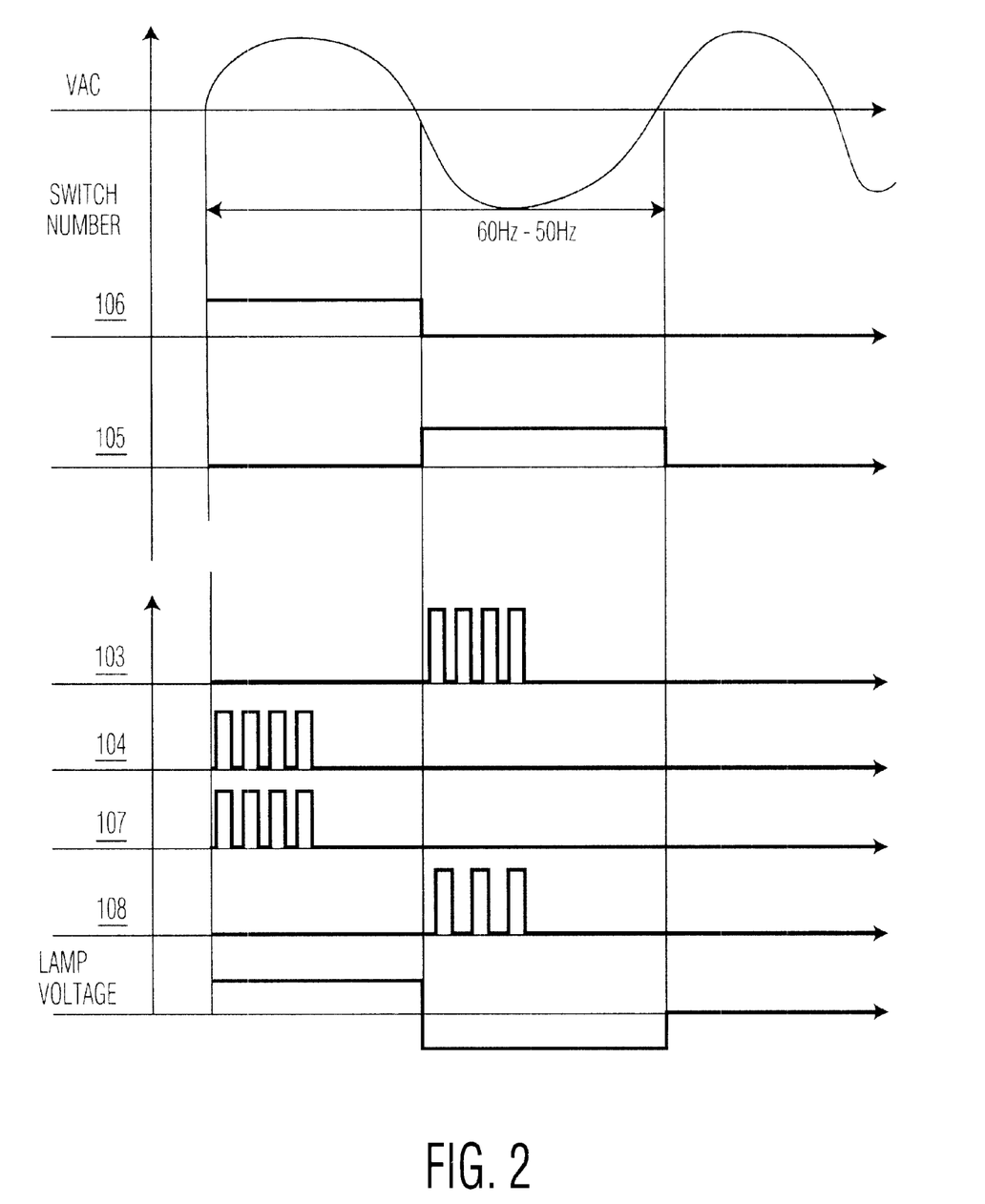
FIG. 2 shows a timing diagram of signals generated by a prior art circuit for driving a high intensity discharge lamp.

U.S. Pat. No. 5,917,290 ("the '290 patent") describes a technique for driving an HID lamp. FIG. 1 hereof shows a circuit similar to that of the '290 patent. The circuit of FIG. 1 includes switches 103–108, which may conveniently be implemented as transistors in the preferred embodiment. A controller 165 controls the on and off states of the switches 103–108, preferably by setting appropriate gate voltages. For purposes of clarity, we do not show in FIG. 1 all of the connections from controller 165 to the switches 103–108.

In the arrangement of FIG. 1, two relatively high frequency (e.g., 200 kilohertz) square waves are produced by controller 165. One of those high frequency square waves is utilized to drive the gates of switches 103 and 104, at different times, depending upon whether the alternating input voltage VAC is positive or negative. The other high frequency signal from controller 165 is used to drive the gates of transistors 107–108, depending upon the polarity of the alternating voltage across lamp 115. Switches 105–106 are operated at the frequency of VAC, the same frequency as the voltage across lamp 115. This frequency is typically low, under 100 Hz.

It can be appreciated that the frequency of the signal driving the HID lamp 115 is at the same frequency as the input voltage VAC, which corresponds to the frequency at which switches 105 and 106 are operated. While the foregoing is acceptable in many applications, it is unacceptable if the line frequency of the input voltage VAC is too low. The situation may arise, for example, in Europe, where the line frequency is only 50 hertz, slightly below the minimum frequency at which HID lamp 115 needs to be driven in order to provide satisfactory operation. As a result, a circuit such as that shown in FIG. 1 may cause flicker in the lamp when operated in the European market. Other situations may also make it desirable to operate the lamp using an AC signal at a frequency different from that of the input voltage.

In view of the above, there exists a need in the art for a system which is both simple in design and which may drive an HID lamp or other device at a frequency other than the line frequency.

SUMMARY OF THE INVENTION

The above and other problems of the prior art are overcome in accordance with the teachings of the present invention, which relates to a technique of generating a voltage to drive the HID lamp, which is at a different frequency than that of the input voltage. For purposes of explanation, we refer herein to pulse width modulation (PWM) switches, or high frequency switches. These switches, implemented in the preferred embodiment as transistors, are typically driven with a square wave that is at a much higher frequency (e.g. 200 KHz) than the frequency of the AC voltage across the lamp.

Also for purposes of explanation, we refer herein to a boost and a buck. These terms are known in the art. The boost typically refers to conversion of power from low voltage to high voltage, and the buck refers to conversion of voltage from high voltage to low voltage. In ballasts such as that described herein, the input voltage is usually first put through a boost phase, and is then "bucked" prior to being applied to the lamp. Thus, the input voltage is first stepped up, and then stepped down.

In accordance with the invention, the control circuitry that drives switches such as those of FIG. 1 is configured in a manner such that the arrangement has an in-phase and out-of-phase mode. During the in-phase mode, two different switches operate at high frequency but in synchronization to produce PWM signals. One of the two operates to perform the buck function, and the other operates to perform the boost function. In the out-of-phase mode, a single switch operates in the high frequency PWM mode, and serves to implement the boost and the buck functions.

For each positive portion of the input voltage, there can be an in-phase and out-of-phase lamp voltage, and thus, the lamp voltage may be at twice the frequency as the input voltage. In general, the lamp voltage may operate at any frequency that may be different from the input voltage to the circuit.

The invention generally includes a control function that periodically changes between using a single PWM switch to implement the boost and buck functions, and using two PWM switches in synchronization, one for the boost function and one for the buck function.

In a system for driving a discharge lamp a power source and a controller each produce a separate periodic signal, and wherein a period associated with the controller's signal divides equally into a period associated with the power source's signal.

DETAILED DESCRIPTION OF THE PREFERRED EMBODIMENT

Figure 3:
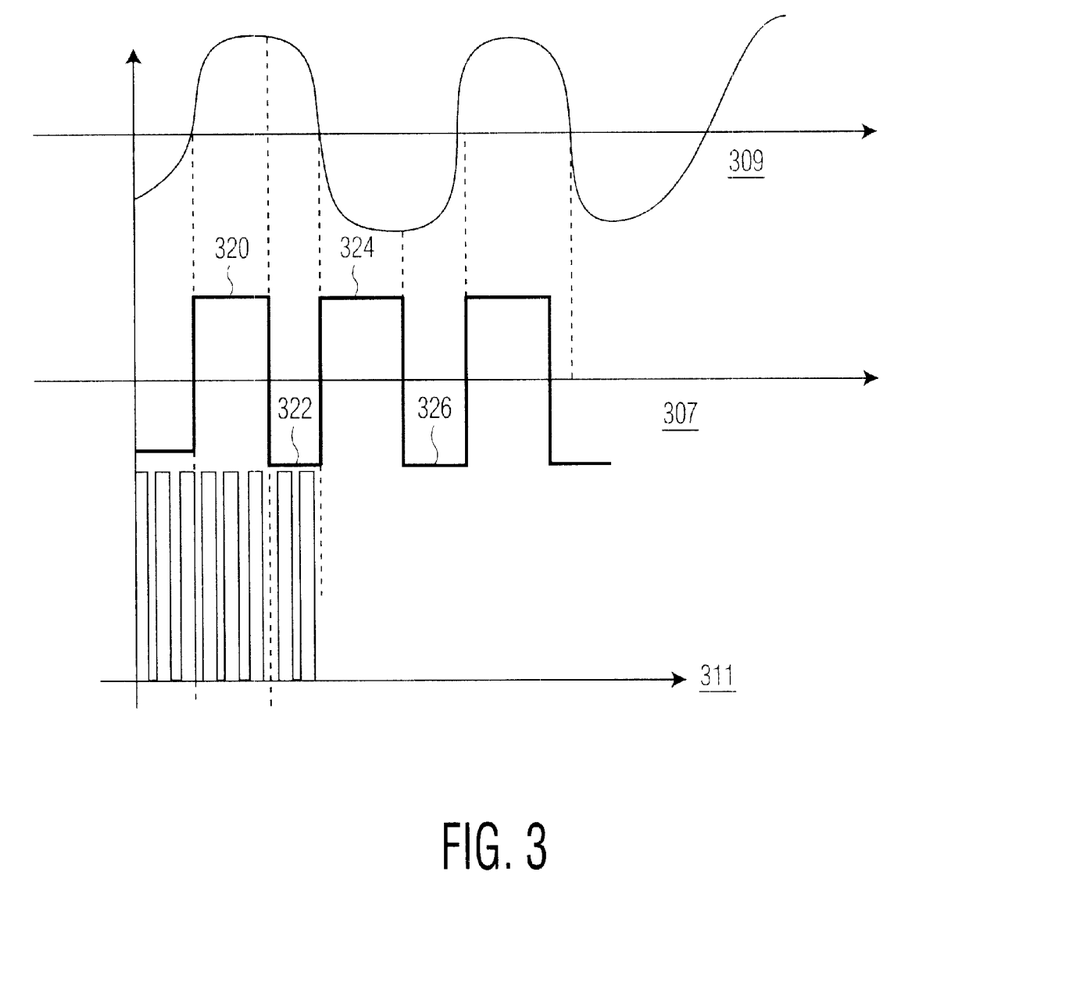
FIG. 3 shows a preferred set of signals generated by an exemplary embodiment of the present invention.

FIG. 3 shows a timing diagram comparing VAC, the input voltage to the circuit, to the voltage across the HID lamp 115. In the example depicted in FIG. 3, the frequency at which the lamp is driven is approximately twice the frequency of VAC. The timing diagram of FIG. 3 may be generated using the circuit shown in FIG. 1. Such a circuit should be operated as described below, utilizing the particular control sequence and the novel controller as discussed below.

FIGS. 4–11 depict eight possible states of the exemplary circuit utilized in connection with the present invention. Not shown connected for purposes of simplicity in FIGS. 4–11 is the control circuitry. More specifically, switches 103–108 represent switches, which may be turned on or off by applying appropriate voltages as is well known in the art. These switches 103–108 may be, for example, MOSFET devices, or any other type of switching device. Typically, a computer controller would be connected to the gate voltages of the devices and would control the activation and deactivation of the gate voltage in order to open and close the switch. Such a controller is not shown for purposes of clarity.

Each switch 103–108 is also connected in parallel with a diode, for purposes of facilitating current flow in only one direction when the switch is in the open state. It is noted that the use of a MOSFET device and diode is exemplary only, and that other devices that implement the same functionality may be used.

We will now describe the operation of the various states of the circuit known in FIGS. 4–11 in order to generate the voltage signal 307 across the HID lamp 115 from an input voltage signal 309 as indicated in FIG. 3. Note that unlike prior art systems, the input voltage waveform 309 is not at the same frequency as the lamp drive voltage 307.

In accordance with a novel aspect of the invention, the switches that are controlled by the high frequency PWM signal to generate the boost and the buck functions are not the same throughout the operating cycle of the ballast. More specifically, as will be outlined in more detail below with respect to FIGS. 4–11, the high frequency pulses are first used to control switches 104 and 107 operating in synchronization. Next, PWM pulses are used to control switch 105 only. In a third phase, the PWM pulses are used to control switch 106 operating on its own, and in still a fourth phase, the PWM pulses are used as a control signal for switches 103 and 108 operating in synchronization.

In the drawings of FIGS. 4–11, the solid arrows represent the flow of current for what is commonly termed the boost, and the non-solid arrows represent the buck function. The boost and buck functions may be in-phase or out of phase with each other, as described more fully below. When in phase different sets of switches are used to implement the boost and buck functions, and when out of phase, the same set of switches is used to implement the boost and buck functions.

We refer below to the PWM switch(es) as the switch(es) being controlled by the PWM signal at a particular time. Also, we refer herein to one of the switches generating a PWM signal, meaning the signal that is output from a switch being driven by a PWM control signal.

Figure 4:
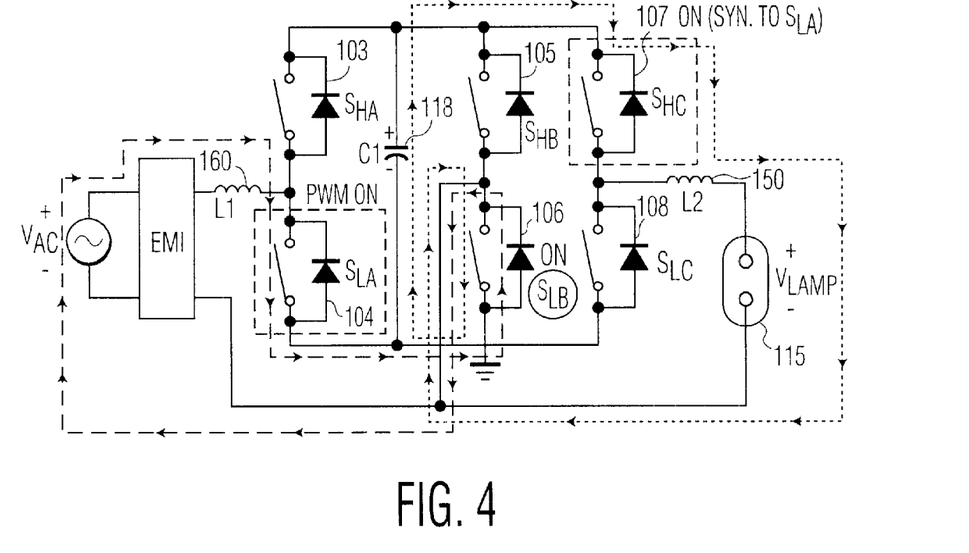
FIG. 4 shows a first mode of operation of a circuit for use in implementing the present invention.

With switch 107 on as shown in FIG. 4, capacitor 118 is discharging through inductor 150 while inductor 160 is being charged via the closed switch 104. Next, switches 107 and 104 switch off. However, since the current tends to remain flowing through inductor 160, that current is now redirected through diode 156 to charge capacitor 118 as shown. Simultaneously with the charging of capacitor 118, the energy from inductor 150 causes the current to remain flowing through HID lamp 115 even after switch 107 opens. This current path is shown in FIG. 5 as well.

Figure 5:
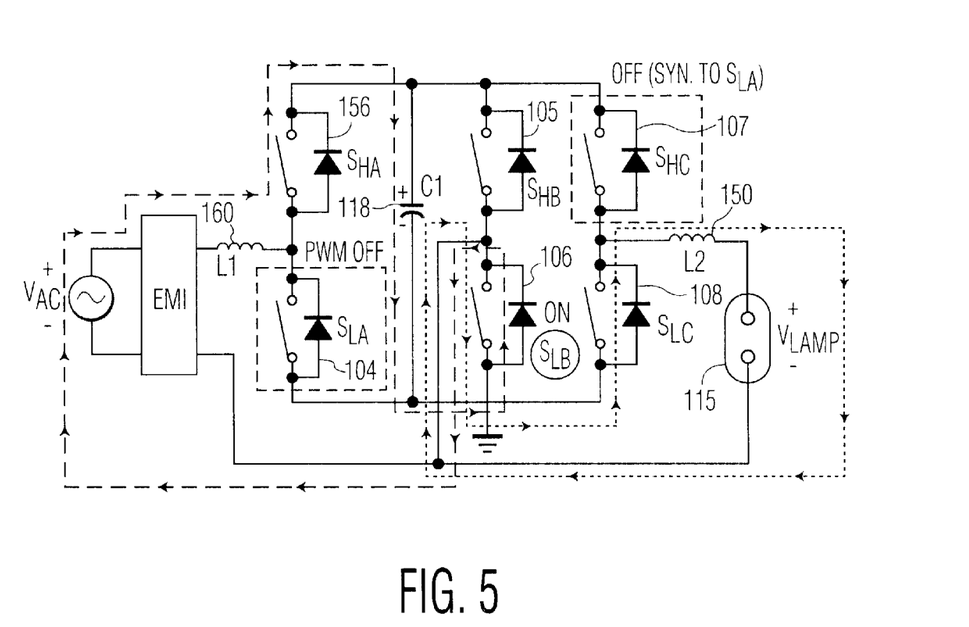
FIG. 5 shows a second mode of operation of a circuit for use in implementing the present invention.

Thus, in summary, FIGS. 4 and 5 represent portion 320 of lamp voltage 307 of FIG. 3. FIGS. 4 and 5 represent the on and off pulsing 311 shown in FIG. 3 during portion 320. In FIG. 4, energy is being transferred from the input source VAC to inductor 160 while previously stored energy is transferred from capacitor 118 to inductor 150 and through lamp 115. In FIG. 5, the energy previously stored in inductor 160 is utilized to charge capacitor 118, while the energy previously stored in inductor 150 is utilized to maintain the flow of current through HID lamp 115. FIGS. 4 and 5 represent row 1201 of FIG. 12.

Figure 6:
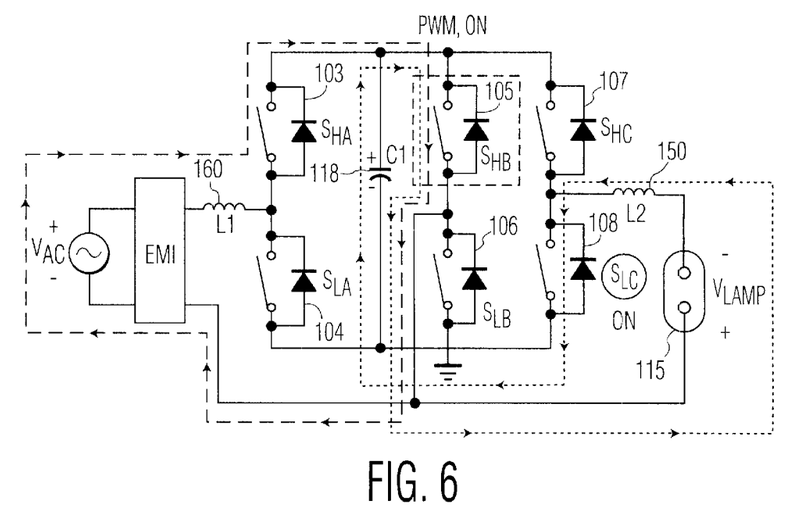
FIG. 6 shows a third mode of operation of a circuit for use in implementing the present invention.
Figure 7:
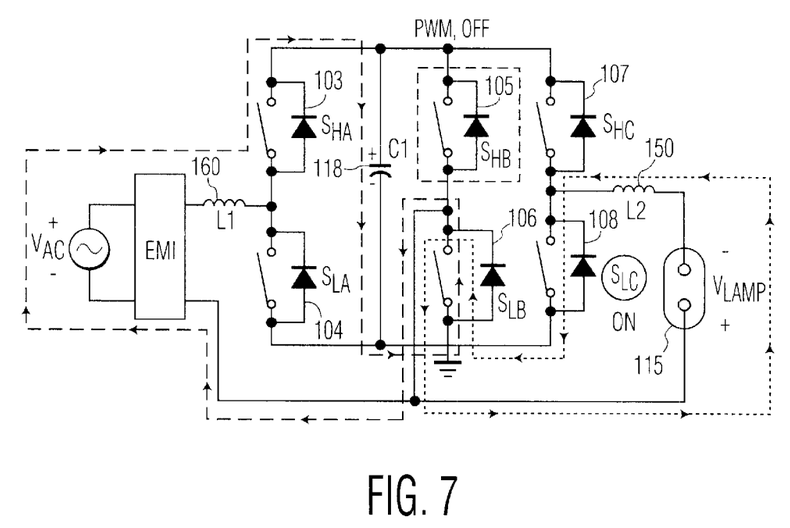
FIG. 7 shows a fourth mode of operation of a circuit for use in implementing the present invention.

Portion 322 of signal 307 is represented by FIGS. 6 and 7. In FIGS. 6 and 7, the transfer of energy from the input source VAC to capacitor 118, and from capacitor 118 through inductor 150 to the HID lamp 115, are both controlled by the same switch 105. More specifically, during portion 322, switch 105 operates in a PWM mode, with the on period being represented in FIG. 6 and the off period being represented in FIG. 7. During the on period, energy is discharged from capacitor 118 through inductor 150, thereby delivering a negative voltage to HID lamp 115.

Figure 12:
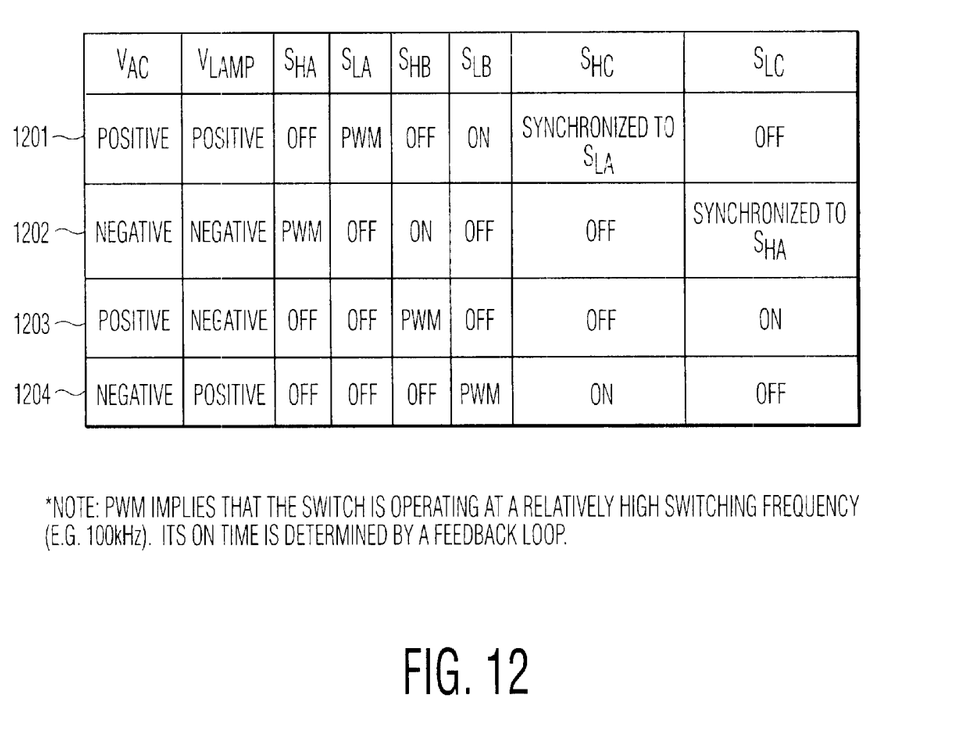
FIG. 12 shows a state table indicating the relationship between the voltage across the HID lamp and the input voltage to the circuit.

Portion 322 of signal 307 represents row 1203 of FIG. 12, wherein the input voltage VAC is positive and the voltage across lamp 115 is negative as shown. FIGS. 6 and 7 represent the on and off states respectively of PWM modulated switch 105. In FIG. 6, switch 105 is on and switch 106 off, allowing for a current path through switch 105 as shown. More specifically, during the on time for the PWM signal, current flows through inductor 160 and switch 103 as shown, resulting in energy being stored in inductor 160. Simultaneously therewith, energy is discharged from capacitor 118 through switch 105 as shown and through inductor 150. Thus, while energy is being stored into inductor 160, energy from capacitor 118 is being delivered to the lamp 115.

When PWM switch 105 turns off, the current flowing through inductor 160 tends to keep flowing, and is now diverted to capacitor 118 in order to facilitate the charging thereof, as indicated in FIG. 7. While tie capacitor 118 charges, current in the negative direction through lamp 115 is maintained due to the energy stored in inductor 150, which tends to keep the current flowing.

Thus, the difference between FIGS. 6 and 7 can be thought of as follows. In FIG. 6, energy is delivered to the lamp from capacitor 118, which also delivers energy to the inductor 150. Simultaneously therewith, energy is delivered to inductor 160. In FIG. 7, when PWM switch 105 turns off, the energy previously delivered to inductor 160 in FIG. 6 is now delivered to capacitor 118 from inductor 160. Simultaneously therewith, the energy previously delivered to inductor 150 is now delivered to HID lamp 115. Thus, the energy delivered from the original input voltage source is first stored in inductor 160, next delivered to capacitor 118, and then delivered from capacitor 118 to lamp 115 through inductor 150. The PWM switch 105 is thus used in a high frequency PWM mode for both the boost and buck functions, rather than having separate switches for the boost and the buck.

Figure 8:
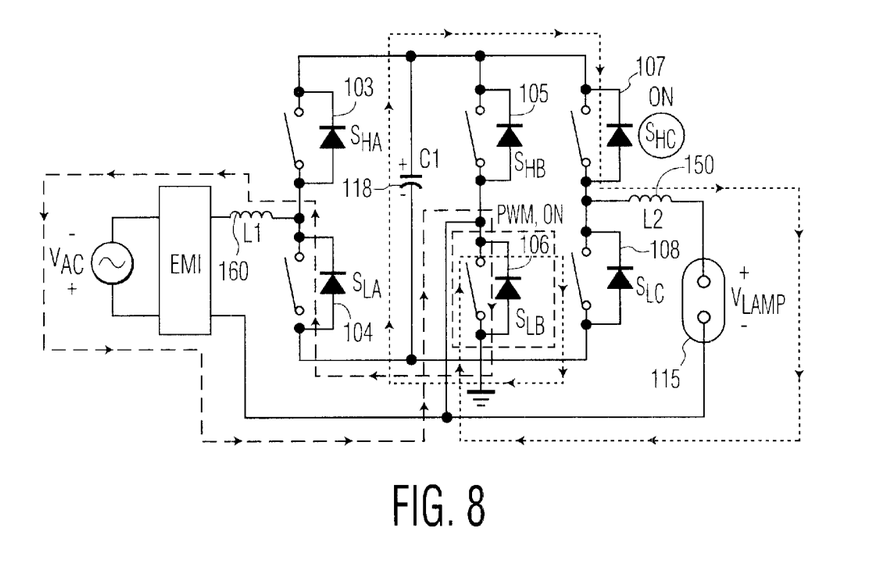
FIG. 8 shows a fifth mode of operation of a circuit for use in implementing the present invention.
Figure 9:
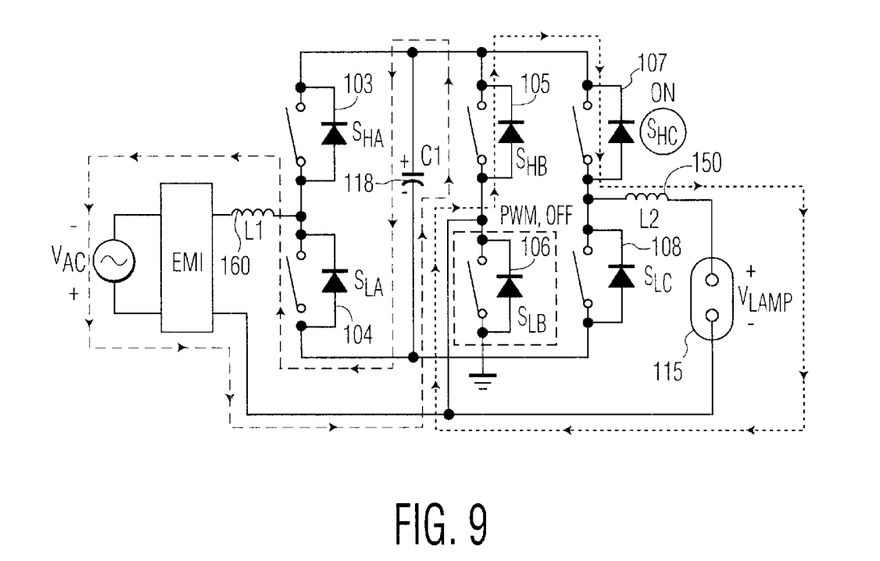
FIG. 9 shows a sixth mode of operation of a circuit for use in implementing the present invention.

The PWM signal at switch 105 is maintained throughout portion 322 of signal 307 of FIG. 3 up until portion 324 begins. The behavior of the PWM switches during portion 324 represent row 1204 of FIG. 12. In portion 324 of signal 307, switch 106 acts as the PWM switch to deliver power to the lamp 115 as well as to facilitate the charging and discharging of capacitor 118. When switch 106 is in the on position, as shown in FIG. 8, current is delivered through inductor 160 utilizing the path shown in FIG. 8. This path causes energy to be stored in inductor 160 for use as described later with respect to FIG. 9. Simultaneously therewith, charge is delivered from capacitor 118 through inductor 150 to light lamp 115 utilizing the path through switch 106 as also shown in FIG. 8. When switch 106 is turned to the off position, the path through such switch is cut off and the current flowing through inductor 160 continues to flow utilizing the new path shown in FIG. 9. This causes the energy stored in inductor 160 to be delivered to capacitor 118 for storage and use during a later cycle. Simultaneously therewith, the current flowing through inductor 150 also tends to stay flowing and thus flows through the diode, which is part of, switch 105 in the direction shown.

Accordingly, energy stored in inductor 150 is delivered to lamp 1 15 to keep the lamp lit. The alternating pulses shown in FIG. 3 as signal 311 alternate the state of the circuit between FIGS. 8 and 9 for the duration of portion 324 of signal 307. Thus, in FIGS. 8 and 9, the boost and buck functions are both accomplished using switch 106.

Figure 10:
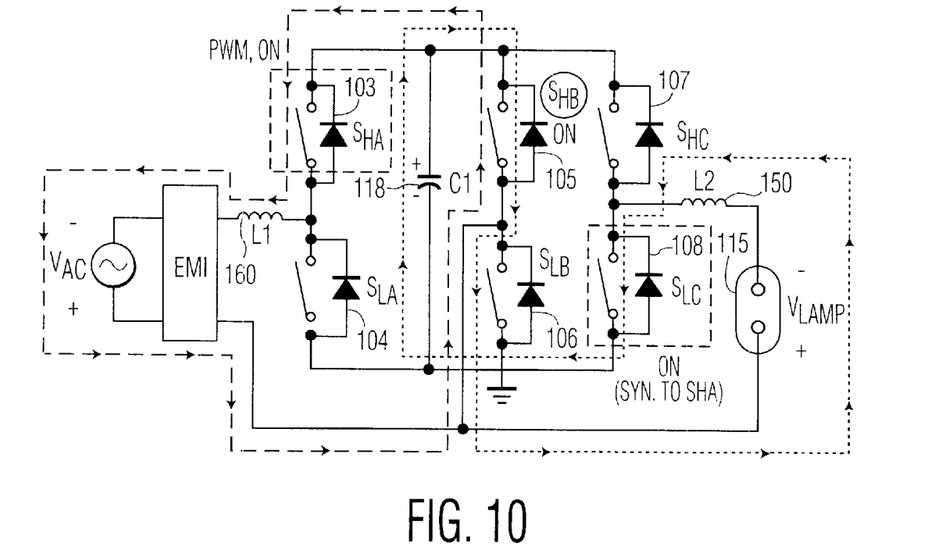
FIG. 10 shows a seventh mode of operation of a circuit for use in implementing the present invention.
Figure 11:
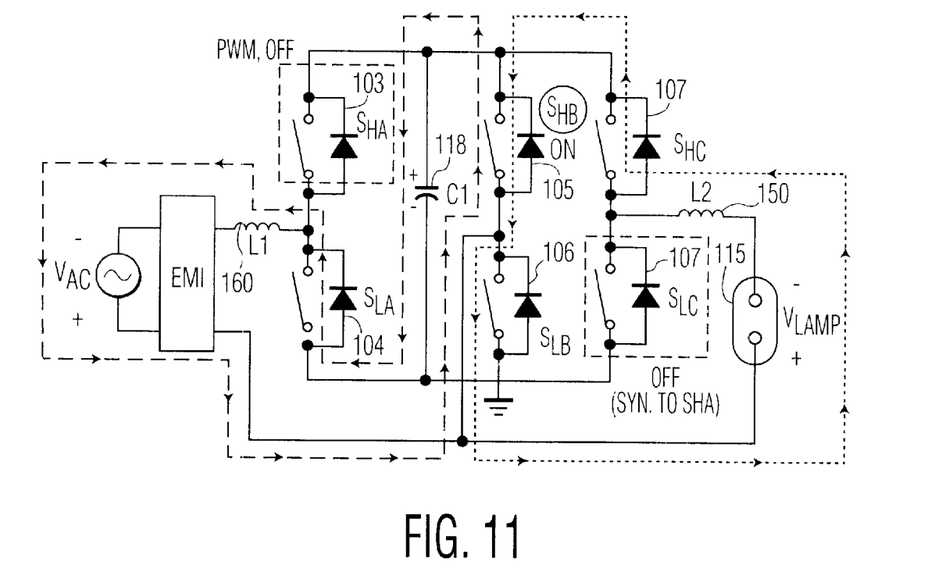
FIG. 11 shows a eighth mode of operation of a circuit for use in implementing the present invention.

At the end of portion 324, the circuit switches to a state where the voltage across the lamp 115 becomes negative while the input voltage stays negative, as shown as portion 326 in FIG. 3. The on and off pulsing in signal 311 during this portion 326 is represented by FIGS. 10 and 11, respectively. This state corresponds to row 1202 of FIG. 12. The portion of the operation of the circuit is similar to the operation during portion 320, accept that the boost and buck functions are now accomplished by switches 103 and 108 in synchronization, rather than by switches 104 and 107 in synchronization.

When switches 103 and 108 are in the on position, current flows from the input voltage through switches 105 to 103 and causes energy to be stored within inductor 160. Simultaneously therewith, energy is discharged from capacitor 118 through lamp 115 and inductor 150, as well as through switch 108 as shown in FIG. 10. When the PWM signal is turned off, the energy stored in inductor 160 maintains the current flowing. However, the current flowing through inductor 160 can no longer also flow through switch 1.03. Accordingly, the path is changed as shown in FIG. 11 and the energy stored in inductor 160 is now utilized to charge capacitor 118 with energy. Simultaneously therewith, energy flowing through inductor 150 continues to flow to keep the lamp 115 lit.

As can be appreciated from the foregoing, the invention contemplates a circuit whereby a PWM switch is utilized to deliver energy to a high intensity discharge lamp. The PWM signaling for both boost and buck functions are implemented using one switch during certain portions of the operating cycle of the device. During other portions of the operating cycle of the device, the PWM signaling is implemented using two different switches operating in synchronization. In a preferred embodiment, a control signal is utilized to periodically switch between using separate switches for the boost and buck functions, and using the same switch for the boost and buck function.

Generally, during a portion when the PWM signal is on, energy from the input voltage source is delivered to a first energy storage device (inductor 160) while energy from a second energy storage device (capacitor 118) is delivered to a third energy storage device (inductor 150). During the time when the PWM switches are off, energy previously delivered to the first energy storage device (inductor 160) is delivered to the second energy storage device, and energy stored in the third energy storage device is delivered to the HID lamp.

Thus, the basic operation of this system can be thought of more generally as simply three energy storage devices, inductor 160, capacitor 118, and inductor 150. During one mode of operation, a set of switches 103 and 108 is utilized to provide a synchronized PWM signal to facilitate the transfer of energy between the first energy storage device and second energy storage device, as well as between the second energy storage device and the third energy device. During a second mode of operation, only one switch is utilized to transfer energy between the first energy storage device and the second energy storage device, as well as between the second energy storage device and the third energy storage device, during PWM cycles.

Of the six switches shown, there are actually four total modes in which the circuit operates. The first mode utilizes switches 103 and 108 to provide the PWM energy transfer function described above. The second mode of operation uses switches 104 and 107 operating in a PWM synchronization manner to deliver the energy transfer between energy storage devices as discussed above. A third mode of operation uses a single switch 105 to facilitate energy transfer between the first and second energy storage devices as well as between the second and third energy storage devices, and a fourth mode of operation utilizes a switch 106 as a single switch to generate the transfer of energy among the three energy storing devices as described above. As can also be appreciated, when a single switch is used, either 105 or 106, the input voltage and the voltage across lamp 115 are out of phase, whereas when two switches are used, the input voltage and the voltage across lamp 115 are in phase.

While the above describes the preferred embodiment of the invention, various modifications or additions will be apparent to those of skill of the art. Such modifications are intended to be covered by the claims appended hereto.

What is claimed:

1. A circuit for delivering power to a High Intensity Discharge (HID) lamp, the circuit comprising:
   a controller for periodically switching at least one switch off and on to generate a pulse width modulated (PWM) signal, the duty cycle of the signal being indicative of the level of power delivered to the lamp; and
   means for controlling one switch with a PWM signal during first portions of an operating cycle of said lamp, and for controlling plural switches with a PWM signal during other portions of said operating cycle of said lamp.

2. The circuit of claim 1 wherein during said other portions, said plural switches operate in synchronization with each other.

3. The circuit of claim 2 wherein during said other portions, said plural switches comprise a set of two switches.

4. The circuit of claim 2 wherein said plural switches comprise first and second sets of switches which contain no switches in common.

5. The circuit of claim 4 wherein during said first portions, said second set of switches are switched at a lower frequency than said first set of switches.

6. A circuit having a boost and buck function, said circuit comprising:

a plurality of switches; and a controller for controlling said switches in a manner such that during operation, said boost and buck portions utilize separate sets of PWM switches during first portions of an operating cycle, and a common set of PWM switches during second portions of said operating cycle.

7. The circuit of claim 6 wherein the switches are transistors.

8. The circuit of claim 7 wherein each of the switches are connected in parallel with a respective diode.

9. A circuit for operating an HID lamp comprising: means for coupling the HID lamp to an inductor and to a plurality of switches, and a controller for providing a PWM signal to switch the switches on and off, the PWM signal being delivered some of the time to two switches to facilitate synchronous switching of said two switches, and to one switch at other times.

10. The circuit of claim 9 wherein said controller operates over a cycle having a period, and wherein during a first part of said period one switch is controlled with the PWM signal, and during a second part of said period, at least two switches are controlled with said PWM signal.

11. The circuit of claim 10 wherein during said first part, a first switch is controlled with said PWM signal for some of said first part, and a second switch is controlled with said PWM signal for the remainder of said first part, and during said second part, a first pair of switches is controlled with said PWM signal for part of said second part, and a second pair of switches is controlled with said PWM signal for the remainder of the second part.

12. The lamp operating circuit as claimed in claim 9 further comprising a second inductor and a capacitor, wherein the controller operates said plurality of switches to produce at least first and second modes of operation, wherein in the first operation mode the two switches operate so that energy is transferred from the first inductor to the capacitor and between the capacitor and the second inductor, and in the second operation mode only the one switch is operated to transfer energy between the first inductor and the capacitor and between the capacitor and the third inductor.

13. A circuit having a first set of switches, a second set of switches, and a third set of switches, said first, second and third sets of switches being connected in parallel with each other, and a controller for causing the second set of switches to switch on and off to thereby create a PWM signal during a first part of a cycle, and for causing the third and first sets of switches to switch on and off to create a PWM signal during a second part of said cycle, and a discharge lamp connected to said switches to be driven by a voltage controlled by a duty cycle of said PWM signals.

14. The circuit of claim 13 connected to a power source and further comprising at least two inductors and a capacitor, at least one of said inductors connected between said discharge lamp and at least one of said switches, and another of said inductors being connected between another of said switches and said power source, and wherein said capacitor is connected in parallel with said first, second, and third sets of switches.

15. A method of performing a boost and buck function for an HID lamp drive circuit comprising the steps of providing a power supply and periodically switching between utilizing a common set of switches to generate a PWM signal for said boost and buck functions, and utilizing different sets of switches to generate a PWM signal for each of the boost and buck functions.

16. The method of claim 15 wherein during times that said different sets of switches are utilized, said different sets of switches are switched in a synchronous manner with respect to each other.

17. The method of claim 15 wherein the step of providing a power supply comprises providing a power supply with Alternating Current (AC) power having a first period, and wherein said step of periodically switching comprises utilizing a second period for switching, and wherein said first period is an integer multiple of said second period.

18. A system for driving a discharge lamp comprising:

a power source, a first inductor, a capacitor, and a second inductor;

a plurality of switches, configured to facilitate the transfer of energy from the source to the first inductor, from the first inductor to the capacitor, from the capacitor to the second inductor, and from the second inductor to the lamp; and a controller for periodically operating at least two of said switches at a high frequency and a third of said switches at a low frequency so as to facilitate the transfer of energy between at least two of said power source, said first inductor, said capacitor, said second inductor, and said lamp.

19. The system of claim 18 wherein said controller utilizes different ones of said switches in a high frequency mode to produce a PWM signal during operation.

20. The lamp driving system as claimed in claim 18 wherein the controller operates said plurality of switches so that the system has an in-phase and an out-of-phase mode of operation, and during the in-phase mode of operation, said at least two high frequency operating switches operate in synchronism such that one performs a buck function and the other performs a boost function, and in the out-of-phase mode a single switch operates in the high frequency mode so as to implement both the boost and the buck functions.

21. The lamp driving system as claimed in claim 18 wherein the power source is a low frequency source of AC power, and wherein the controller operates said plurality of switches so that the discharge lamp is operated at a low frequency that is different from and independent of the frequency of said AC power source.

22. The system of claim 19 wherein said power source and said controller each produce a separate periodic signal, and wherein a period associated with said controller's signal divides equally into a period associated with said power source's signal.

* * * * *